March 23, 1954  G. A. SMITH  2,673,034
SENSING MECHANISM FOR ACCOUNTING MACHINES
Filed Oct. 11, 1950  3 Sheets-Sheet 1

FIG. I.

INVENTOR.
GEORGE A. SMITH
BY
ATTORNEYS.

March 23, 1954 G. A. SMITH 2,673,034
SENSING MECHANISM FOR ACCOUNTING MACHINES
Filed Oct. 11, 1950 3 Sheets-Sheet 2

INVENTOR.
GEORGE A. SMITH
BY
ATTORNEYS.

March 23, 1954  G. A. SMITH  2,673,034

SENSING MECHANISM FOR ACCOUNTING MACHINES

Filed Oct. 11, 1950  3 Sheets-Sheet 3

INVENTOR.
GEORGE A. SMITH
BY
ATTORNEYS.

Patented Mar. 23, 1954

2,673,034

UNITED STATES PATENT OFFICE 2,673,034

SENSING MECHANISM FOR ACCOUNTING MACHINES

George A. Smith, Chestnut Hill, Pa., assignor to General Register Corporation, Long Island City, N. Y., a corporation of New York Application October 11, 1950, Serial No. 189,521

13 Claims. (Cl. 235—61.11)

1

This invention relates to sensing mechanism for accounting machines and has particular reference to means for sensing pips on slugs or holes in cards which are selectively arranged to carry information, the sensing means being arranged to provide for indication, printing, or calculation determined by such pips or holes.

Pips may be found in metallic slugs by distortion of the metal and when so formed are relatively fragile particularly when they are of small size and closely arranged for the compact recording of information. Holes in cards are likewise subject to distortion in repeated use by reason of engagement with sensing elements. It is one object of the present invention to provide sensing means which may be used in conjunction with pips on slugs or holes in cards and which will avoid damage of the same.

A further object of the present invention is the provision of sensing means of high accuracy and capable of use where the indicating elements such as pips or holes are located in close lines for compactness.

A further object of the present invention is the provision of sensing means which involves positive operation without the use of springs for control of sensing movements.

These and other objects of the invention particularly relating to details of construction and operation will become apparent from the following description read in conjunction with the accompanying drawings, in which.

Figure 1:
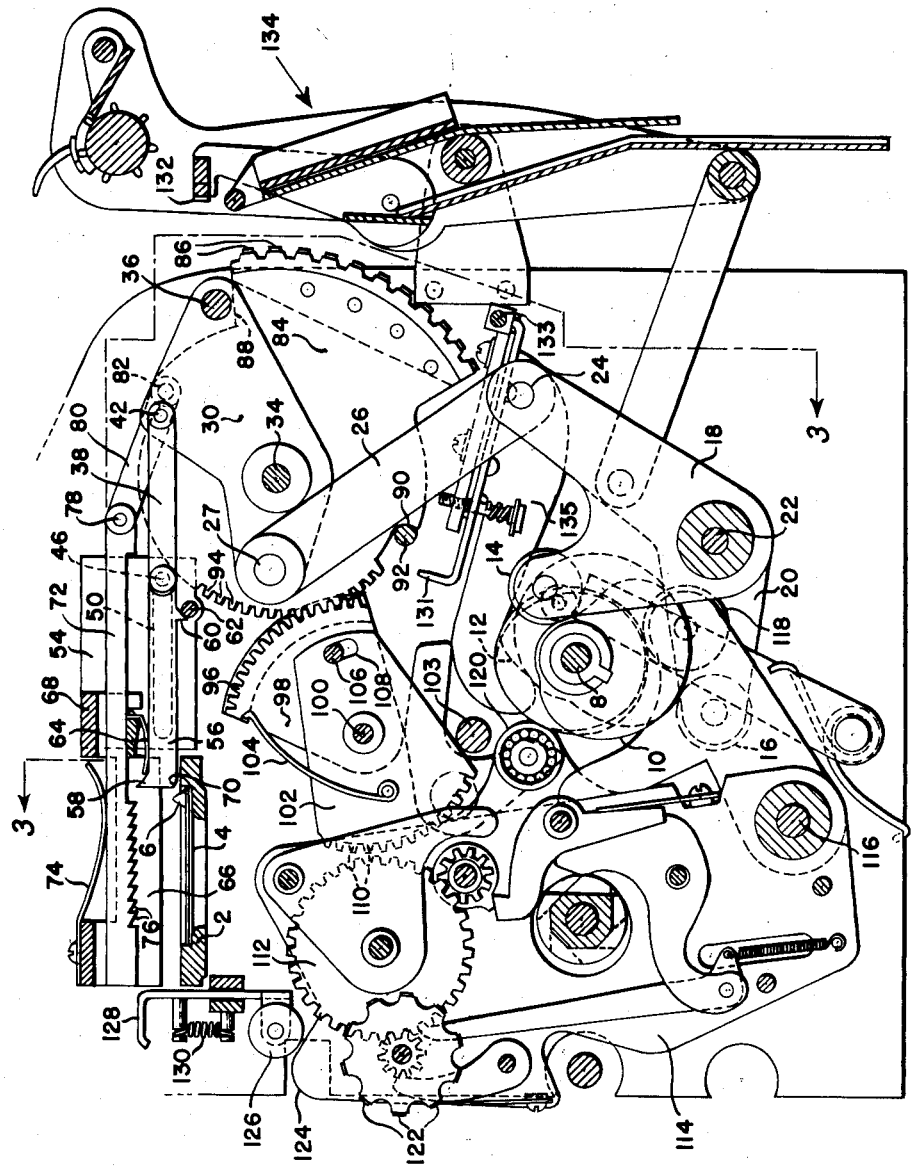
Figure 1 is a vertical section through portions of a ticket-issuing machine with which the improved sensing mechanism is associated for the sensing of pips on slugs.
Figure 2:
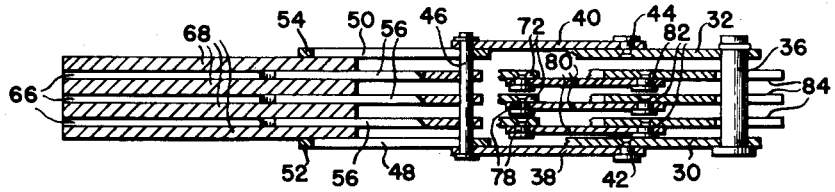
Figure 2 is a horizontal section showing in detail certain of the elements at the upper portion of Figure 1.
Figure 3:
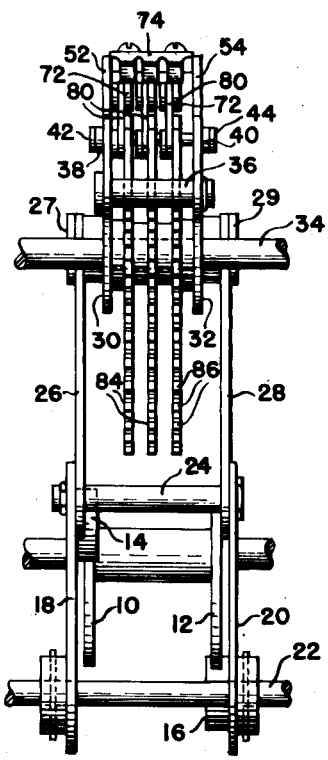
Figure 3 is a vertical section taken on the broken surface, the trace of which is indicated at 3—3 in Figure 1.
Figure 5:
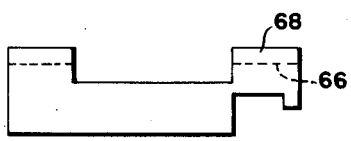
Figure 5 is a side elevation of one of the parts of the mechanism illustrated in Figure 1.
Figure 6:
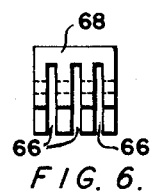
Figure 6 is an end elevation of the same part.
Figure 4:
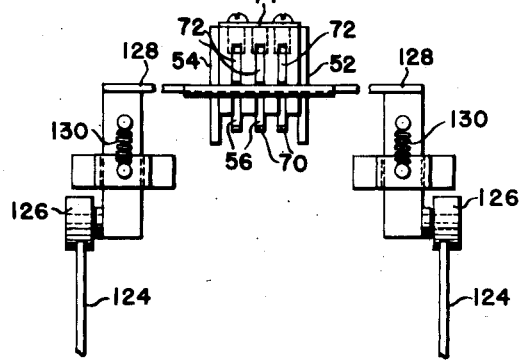
Figure 4 is a fragmentary elevation showing certain parts at the left-hand side of Figure 1.

Reference will now be made to Figures 1 to 7, inclusive, showing the slug pip sensing mechanism which is adapted for use in such a machine as that illustrated and described in the application of Reuben H. Helsel, Serial Number 68,001, filed December 29, 1948. The mechanism of said application is particularly adapted for the issuance of transportation tickets which are printed by the machine upon the insertion of metallic slugs which carry type faces for the imprinting of variable data on tickets. Said machine is adapted in particular to issue strips containing multiple tickets, the individual tickets of a strip, for example, providing for passages between pairs of railroad stations or other locations. As described in said application, the machine not only prints and issues tickets as aforesaid, but serves as an accounting mechanism keeping records in printed form of the issues of the tickets, the records including, for example, such matters as the particulars of the types of tickets issued and the fares charged, taxes thereon, etc. In addition, the mechanism provides a totalizer so that the aggregate amounts of fares and taxes may be determined from time to time. In order to accomplish these accounting ends, the slugs are provided with pips arranged in transverse lines and recording on each slug the information to be derived therefrom for recording purposes.

The present invention will be described in particular as applied to the machine of said Helsel application which will typify the uses of the invention. To this end there are shown in the drawings and described certain parts of said machine as are necessary to indicate the fashion in which the sensing means operates. For more complete details, reference may be had to said pending Helsel application.

Figure 7:
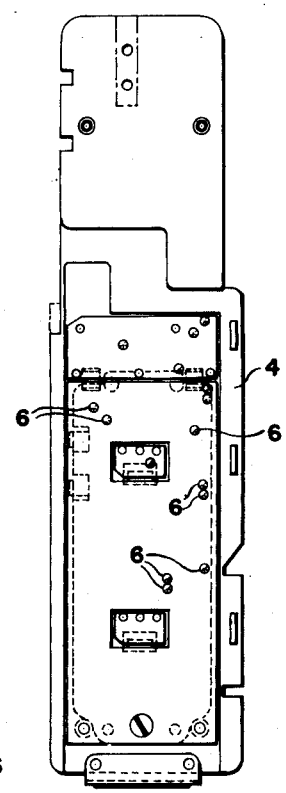
Figure 7 is a top plan view of a slug such as used in Figure 1.

A guideway provided at 2 serves for the reception and guidance of longitudinal movement of the slug 4 which is particularly illustrated in Figure 7 and will be recognized to be the slug used in said Helsel machine. This slug carries various pips 6 projecting from its upper surface and selectively arranged in various lines across the slug so that the positions of these pips are indicative of information pertaining to the slug and the particular ticket or tickets to be issued thereby. Certain of the pips may not have numerical significance but may, for example, indicate various classes of tickets or the identification of the stations between which the corresponding tickets are to be used. Other assemblies of pips, however, have truly numerical significance in indicating, for example, fares charged for the tickets and taxes which may be assessed on the sales. While the pips of both classes control sensing mechanism to provide recording, the pips of the numerical classes may additionally control accumulating devices for the totaling of the fares and taxes. In order to simplify the description and at the same time render it more general particular reference will be made to both the recording of the numerical values of one set of pips and to the totalizing of these values.

A shaft 8 is rotatable during the cycle of the machine and carries a pair of cams 10 and 12 acting respectively on rollers 14 and 16 carried by bell cranks 18 and 20 which are connected through their hubs to a transverse shaft 22. The ends of the bell cranks opposite the rollers are connected by a pin 24 to which are pivoted links 26 and 28 in turn pivoted at 27 and 29 to levers 30 and 32 which are secured to a rock shaft 34. The levers 30 and 32 are connected by a transverse pin 36 and have pivoted to them links 38 and 40 at 42 and 44, respectively. These links are connected by a pin 46 which is arranged to slide in slots 48 and 50 provided in vertical plates 52 and 54. Journalled on the pin 46 are sensing members 56 which at their forward ends are provided with sharp upwardly directed noses 58 and which are provided near the pin 46 with downwardly extending projections 60 having sloping rear edges arranged to ride up a pin 62 carried by the plates 52 and 54. The sensing members 58 are urged downwardly by light leaves of a spring comb 64 which is carried by a transverse bar secured to a guide member 68 provided with slots 66, best illustrated in Figures 5 and 6, which serve for the longitudinal guidance of the sensing members 56. The lower front end of each sensing member 56 is bevelled, as indicated at 70, so that during its forward movement it may readily ride up and over a pip 6 which is in alignment with its path. It may be here explained that the machine, as shown in said Helsel application, is provided with means for accurately fixing the slug positions at the time of sensing so as to bring a predetermined transverse line of the slug into the path of each sensing element.

Arranged to slide in each slot 66 above a sensing element is a corresponding slide 72, these slides being lightly held downwardly by the action of the leaves 74 of a spring comb mounted on the member 68. Each of the slides 72 is provided at its lower edge with teeth 76 which are respectively arranged to correspond to the various pip positions transverse of the slug. As will be hereafter described more fully, a sensing element will normally move forwardly in a position to miss the teeth 76 but upon engagement with a pip will be raised so as to engage selectively one of the teeth, thereafter carrying forwardly with it during its stroke the slide 72.

Links 80 are connected to the slide 72 at pivots 78 and are, in turn, connected at 82 to members 84 which are loosely journalled on the shaft 34. The members 84 are provided with type faces indicated at 86 which correspond in their positions and designations to the pip positions transverse of the slugs. The members 84 are provided with shoulders 88 which, as will appear hereafter, cooperate with the pin 36. The members 84 are also provided with shoulders 90 which serve to limit their clockwise rotations, as viewed in Figure 1, by engagement with a fixed pin 92. The members 84 are provided with teeth 94 which are in mesh with teeth 96 on corresponding sectors 98 pivoted on a transverse pin 100. Corresponding to each sector is a second sector 102, also pivoted on pin 100, and urged in a counterclockwise direction with respect to sector 98 by an individual spring 104 to a point limited by engagement of pin 106 carried by sector 98 with the lower end of a slot 108 formed in sector 102. When the parts are in rest position, however, the sector 102 has its counterclockwise movement limited by engagement with a fixed pin 103, so that pin 106 is in the upper end of slot 108.

The teeth 110 of sector 102 are arranged to mesh at proper times with the teeth of the corresponding pinion 112 which forms part of an accumulator assembly carried by plates 114 and pivoted to rock about a pin 116, the rocking movement being imparted to the accumulator assembly by the action of suitable cams on shaft 8 on rollers 118 and 120 carried by the assembly. The accumulator assembly includes number printing wheels 122.

Reference to the Helsel application mentioned above will show that the members 84, sectors 98 and 102, and the accumulator assembly illustrated herein correspond to what is shown and described in said application, and since the operation from the standpoint of printing and accumulating is the same as in said application, it will not be more fully described herein.

There is, however, one addition to the accumulator assembly in the nature of a pair of cam extensions 124 carried by the plates 114 and adapted to act as the accumulator assembly moves to the right in Figure 1 upon rollers 126 carried by a slide 128 which is urged downwardly by springs 130. As will be clear from Figures 1 and 4, the slide 128 has a flat upper surface over which there is adapted to project the slides 72 which, in turn, will be raised by the slide 128 when the accumulator mechanism is rocked to the right or rearwardly.

Printing by the type members 86 is effected as described in detail in said Helsel application by the arrangement of a hammer assembly 134 which carries a suitable hammer 132 tripped at the proper time to force a record strip and carbon paper into contact with the type. The printing arrangement associated with the accumulator numeral wheels 122 is as described in said Helsel application and is not shown herein.

Definite positioning of the members 84 is accomplished as in said Helsel application by engagement of the end 131 of a member pivoted to a fixed pin at 133 between the teeth 94, this member being operated through arm 135 from a suitable cam on the shaft 8.

The operation of the mechanism so far described is as follows:

The elements in their rest positions are as illustrated in Figure 1. When the sensing operation is about to begin, rotation of the shaft 8 takes place causing the bell cranks 18 and 20 to rock clockwise as viewed in Figure 1. The result is to rock the members 30 and 32 counterclockwise causing the sensing members 56 to move toward the left or forwardly as viewed in Figure 1. As the sensing members move forwardly, their projections 60 are released by the pin 62 and their forward ends are lightly pressed downwardly by the spring leaves at 64. Forward motion occurs at a level such that the nose 58 of each sensing member clears teeth 76 of the corresponding slide until the bevel 70 engages a pip 6 in its path by which pip it is cammed upwardly to engage a corresponding tooth of the slide 72. As the forward motion then continues, the slide 72 is correspondingly moved forwardly by the sensing member which continues to ride over the top of the pip. As the slide 72 moves forwardly it carries with it the corresponding member 84 and at the end of the stroke of the sensing member 56, the member 84 will have been displaced to a position corresponding to the position of the pip, thereby locating a corresponding type element 86 in line with the hammer 132. As will be evident from the construction, the sensing members 56 have an invariable extent of movement, and the movement of each slide 72 and member 84 corresponds to that amount of the full stroke which follows engagement of a pip by the corresponding sensing member. At the completion of the full forward stroke of the sensing members, the member 131 is engaged between teeth 94 locking the members 84 in definite positions, the member 131 being so shaped as to have a wedge-like action between the teeth, thus insuring positive and accurate alignment. The printing operation is then effected by the tripping of the cocked hammer 132. It will be noted that the shock involved in the printing is not taken by the sensing member but rather by the element 131 which is positioning the members 84.

In the meanwhile, each sector 98 will have been rotated clockwise to an extent corresponding to the rotation of its corresponding member 84, and the sector 102 will also have been rotated following the engagement of the lower end of the slot 108 by pin 106, the operation occurring as described in said Helsel application. The member 131 is now freed from the members 84 and they are consequently free to be restored to initial position. Just prior to the beginning of their restoration, the accumulator assembly is rocked toward the right in Figure 1 producing meshing of the pinions 112 with the teeth 110 of the sectors 102. As this rocking action takes place, the cams 124 act on rollers 126 to raise slide 128 and this, in turn, raises all of the slides 72 out of engagement with the points 58 of the sensing members 56. The result of this is that the sensing members are free to move on their return strokes clearing the teeth 76. As the clockwise oscillation of the members 30 and 32 takes place, the sensing members will be first partially retracted and then, as the pin 36 engages the members 84, these members will be successively returned to their original position in which their shoulders 90 engage pin 92. During these return movements of the members 84, the accumulator pinions 112 will be rotated to extents corresponding to the initial displacements of the members 84 thus serving to operate the accumulator mechanism as described in said Helsel application. At the end of the operation, the sensing members 56 will have been restored to their original positions and this will also be true of the slides 72. The numeral wheels 122 of the accumulator will accordingly be advanced to add to their original indications the amounts determined by the pips on the slugs.

It may be here noted that while only three members 84 are illustrated, there may be various other groups of these members all of which may be similarly controlled by devices such as those described including pairs of members 30 and 32 secured to the shaft 34.

Figure 9:
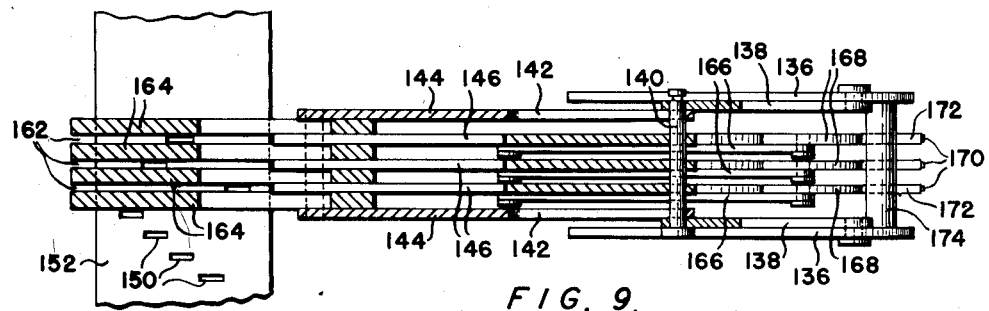
Figure 9 is a horizontal section showing certain parts at the upper portion of Figure 1, the section being taken on the plane the trace of which is indicated at 9—9 in Figure 8.
Figure 8:
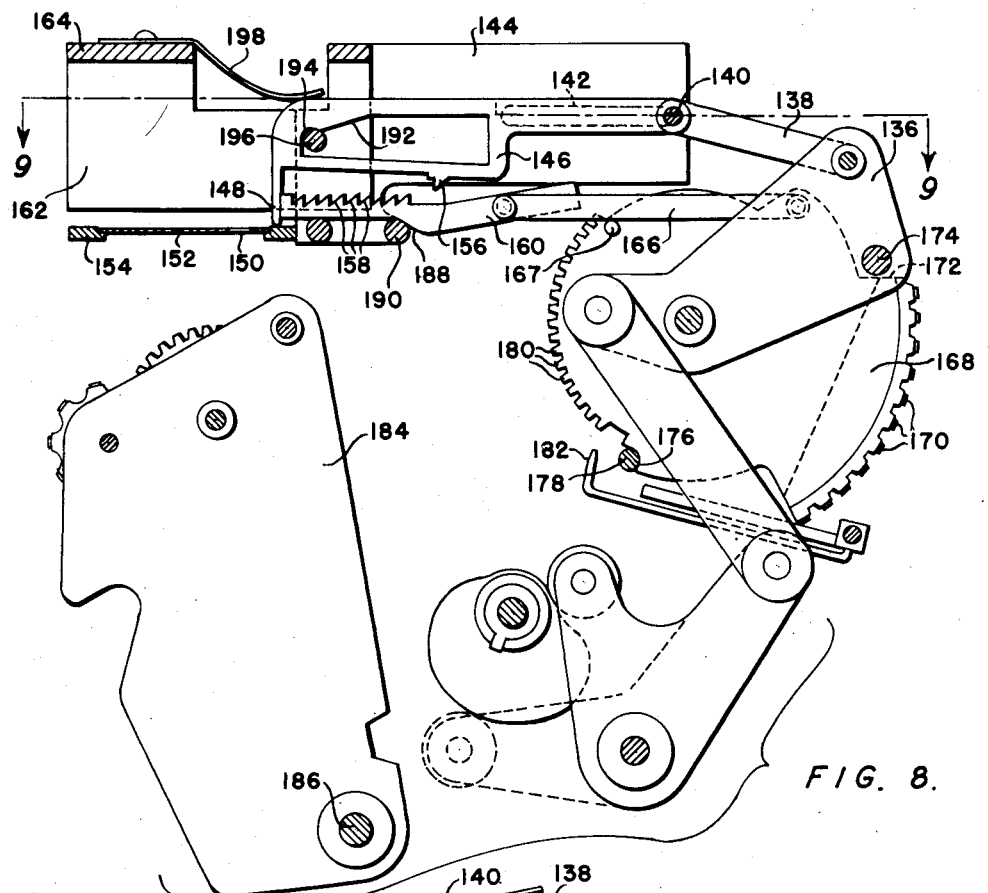
Figure 8 is an elevation, partly in section, similar to Figure 1, but showing in particular sensing means suitable for sensing the holes in cards.
Figure 10:
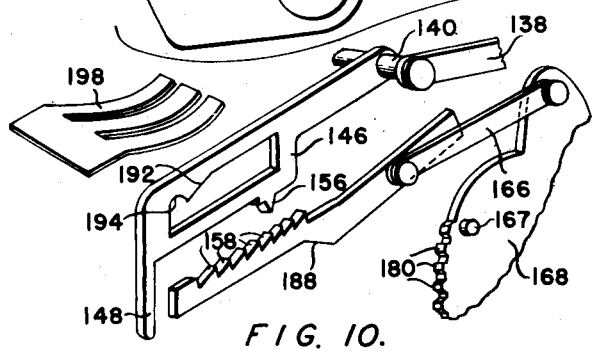
Figure 10 is an exploded perspective view showing certain of the elements of the sensing mechanism.

From the above description, it will be evident that the pips 6 on the slug are relieved from the application of any substantial forces which might tend to distort or wear them. They serve solely for raising the sensing members 56 into engagement with teeth 76 and during the advance of the slides 72 they merely hold and maintain that engagement. In fact, if the teeth 76 are undercut and the noses 58 of sensing members 56 correspondingly project forwardly, the sensing members 56 may be raised out of contact with the pips 6 during the forward strokes of the slides 72. The pips 6 are not even caused to assume the pressure of leaves 58 during return of the slides 72 due to the action of slide 128 which disengages teeth 76 from the points 58 of the sensing members. It may be further noted that the movements imparted to the members 84 are positive in both directions, there being no springs involved in either motion. There will now be described the operation of a card sensing mechanism illustrated particularly in Figures 8 to 10, inclusive, which is in many respects similar to the sensing mechanism already described so that those parts which are duplicated need not be described in detail, the constructions and functions being as previously pointed out.

Rocking members 136 corresponding to members 30 and 32 are provided and these are connected by links 138 to a transverse pin 140 which is guided for movements in slots 142 in plates 144. Journalled on the pin 140 are sensing members 146 which are provided with noses 148 projecting downwardly and adapted to slide over the surface of a card 152 provided with elongated openings 150 and positioned by a guide arrangement shown at 154. Arrangements (not shown) provide for alignment of the cards in a lengthwise direction so that their openings 150 are lined up with the paths of movement of the sensing members 146 which are guided in slots 162 in a member 164. Also guided in these slots are members 160 which are provided teeth 158 engageable by single teeth 156 on the sensing members 146. Each of the members 160 is pivoted to a link 166 which is in turn pivoted to a member 168 corresponding to a member 84 previously described and carrying type elements indicated at 170. Each member 168 is provided with a shoulder 172 engageable by a transverse pin 174 carried by members 136. Each member 168 is also provided with a shoulder 176 engageable with a fixed stop pin 178. Each member 168 is provided with teeth 180 corresponding to teeth 94 previously described and these teeth are arranged to be engaged by a member 182 corresponding to 131. For simplicity, the sectors intermediate the members 168 and the accumulating mechanism 134 are omitted, the accumulating mechanism being provided in a frame pivoted at 186 as previously described.

Each member 160 is provided with a sloping lower edge portion 188 which is arranged to ride over a fixed pin 190. When the parts are in rest position, each link 166 rests on a pin 167 carried by its corresponding member 168 to insure proper position of member 160 as illustrated.

Each of the sensing members 146 is provided with an opening having a sloping portion 192 and a socket 194 which, when the sensing members are in rest position, lies over the fixed pin 196. The sensing members are urged downwardly by the leaves 198 of a spring member secured to 164.

The operation of the card sensing mechanism may now be described. Assuming that a card is in proper position, counterclockwise rotation of the plates 136 will advance the sensing members which will first clear their sockets 194 from pin 196 and will thereafter drop as the sloping edge 192 rides over pin 196. Each sensing member will then ride over the surface of the card under the light force applied by its corresponding spring leaf 198. When a nose 148 reaches the position of a hole 150 it will drop therein bringing its tooth 156 into engagement with a tooth 158 of the corresponding member 160, the tooth which is engaged being that corresponding to the position of the hole 150. Prior to reaching a hole, the nose 148 will be so raised by the surface of the card that the tooth 156 will clear teeth 158.

As soon as engagement of the teeth occurs, the corresponding member 160 will be advanced and, immediately upon such advance, will be rocked upwardly by the edge 188 which rides over pin 190. This action serves additionally to raise the sensing member 146 so that its nose 148 will be raised clear of the upper surface of the card. The holes 150 are elongated in the direction of motion of the sensing members so that their edges are not engaged by the nose during the forward movement after it first enters the hole. As the forward movement continues the members 168 will be rocked to a final position, at the end of the stroke of the sensing members, such that their displacement will correspond to the position of the corresponding hole in the card. At the end of the forward movements, locking of the members 168 by member 182 will occur and printing may be effected.

On the reverse stroke the sensing members 146 will move relatively to the members 160 and in this movement the tooth 156 will click over the teeth 158. It will be noted, however, that this action is without any engagement of the noses 148 with the cards and, consequently, the cards are not subject to damage. The various members 168 will be successively picked up by the pin 174 to be returned to their initial positions and in such return the accumulator will be actuated as previously described. At the end of the return movement, the parts will have returned to the initial positions illustrated in Figure 8. It will be noted that in this modification of the invention, as in the case of the pip sensing mechanism, there is no force exerted such as will serve to damage the indicating means on the element being sensed. There is also as in the previous modification a positive movement imparted in both directions to the type-carrying members 168.

What is claimed is:

1. A sensing device for selectively positioning an element under the control of indicia located in a stationary record member to be sensed comprising a sensing member, means for moving said sensing member across the stationary record member and an indicia thereon, said sensing member being movable transversely to the first mentioned movement upon sensing said indicia, and a member associated with said sensing member and constructed and arranged to be picked up by said sensing member upon said transverse movement of the sensing member and thereupon to be moved by said sensing member during a remaining portion of the movement of said sensing member across the record member.

2. A sensing device for selectively positioning an element under the control of indicia located on a stationary record member to be sensed comprising a sensing member, means for moving said sensing member across the stationary record member and an indicia thereon in a stroke of invariable length, said sensing member being movable transversely to the first mentioned movement upon sensing said indicia, and a member associated with said sensing member and constructed and arranged to be picked up by said sensing member upon said transverse movement of the sensing member and thereupon to be moved by said sensing member during the remaining portion of the movement of said sensing member across the record member.

3. A sensing device for selectively positioning an element under the control of indicia located on a stationary record member to be sensed comprising a sensing member, means for moving said sensing member across the stationary record member and an indicia thereon, said sensing member being movable transversely to the first mentioned movement upon sensing said indicia, and a member associated with said sensing member and constructed and arranged to be picked up by said sensing member upon said transverse movement of the sensing member and thereupon to be moved by said sensing member during a remaining portion of the movement of said sensing member across the record member, said sensing member having a tooth and the last mentioned member having a plurality of teeth selectively engageable by said tooth in accordance with the indicia sensed.

4. A sensing device for selectively positioning an element under the control of indicia located on a stationary record member to be sensed comprising a sensing member, means for moving said sensing member across the stationary record member and an indicia thereon in a stroke of invariable length, said sensing member being movable transversely to the first mentioned movement upon sensing said indicia, and a member associated with said sensing member and constructed and arranged to be picked up by said sensing member upon said transverse movement of the sensing member and thereupon to be moved by said sensing member during the remaining portion of the movement of said sensing member across the record member, said sensing member having a tooth and the last mentioned member having a plurality of teeth selectively engageable by said tooth in accordance with the indicia sensed.

5. A sensing device for selectively positioning an element under the control of indicia located on a stationary record member to be sensed comprising a sensing member, means for moving said sensing member across the stationary record member and an indicia thereon, said sensing member being movable transversely to the first mentioned movement upon sensing said indicia, and a member associated with said sensing member and constructed and arranged to be picked up by said sensing member upon said transverse movement of the sensing member and thereupon to be moved by said sensing member during a remaining portion of the movement of said sensing member across the record member, said sensing member having a return stroke during which it moves relatively to the last mentioned member, and the last mentioned member having a return movement lagging that of said sensing member.

6. In combination with an element to be selectively positioned under the control of indicia located on a stationary record member to be sensed, a sensing member, means for moving said sensing member across the stationary record member and an indicia thereon, said sensing member being movable transversely to the first mentioned movement upon sensing said indicia, a member associated with said sensing member, connected to said element, and constructed and arranged to be picked up by said sensing member upon said transverse movement of the sensing member and thereupon to be moved by said sensing member during a remaining portion of the movement of said sensing member across the record member to advance said element, and means for positively imparting a return movement to said element.

7. In combination with an element to be selectively positioned under the control of indicia located on a stationary record member to be sensed, a sensing member, means for positively moving said sensing member across the stationary record member and an indicia thereon, said sensing member being movable transversely to the first mentioned movement upon sensing said indicia, a member associated with said sensing member, connected to said element, and constructed and arranged to be picked up by said sensing member upon said transverse movement of the sensing member and thereupon to be moved by said sensing member during a remaining portion of the movement of said sensing member across the record member to advance said element, and means for positively imparting a return movement to said element.

8. In combination with an element to be selectively positioned under the control of indicia located on a stationary record member to be sensed, a sensing member, means for moving said sensing member across the stationary record member and an indicia thereon in a stroke of invariable length, said sensing member being movable transversely to the first mentioned movement upon sensing said indicia, a member associated with said sensing member, connected to said element, and constructed and arranged to be picked up by said sensing member upon said transverse movement of the sensing member and thereupon to be moved by said sensing member during the remaining portion of the movement of said sensing member across the record member to advance said element, and means for positively imparting a return movement to said element.

9. In combination with an element to be selectively positioned under the control of indicia located on a stationary record member to be sensed, a sensing member, means for positively moving said sensing member across the stationary record member and an indicia thereon in a stroke of invariable length, said sensing member being movable transversely to the first mentioned movement upon sensing said indicia, a member associated with said sensing member, connected to said element, and constructed and arranged to be picked up by said sensing member upon said transverse movement of the sensing member and thereupon to be moved by said sensing member during the remaining portion of the movement of said sensing member across the record member to advance said element, and means for positively imparting a return movement to said element.

10. In combination with an element to be selectively positioned under the control of indicia located on a stationary record member to be sensed, a sensing member, means for moving said sensing member across the stationary record member and an indicia thereon, said sensing member being movable transversely to the first mentioned movement upon sensing said indicia, a member associated with said sensing member, connected to said element, and constructed and arranged to be picked up by said sensing member upon said transverse movement of the sensing member and thereupon to be moved by said sensing member during a remaining portion of the movement of said sensing member across the record member to advance said element, and means for positively imparting a return movement to said element, said sensing member having a tooth and the last mentioned member having a plurality of teeth selectively engageable by said tooth in accordance with the indicia sensed.

11. In combination with an element to be selectively positioned under the control of indicia located on a stationary record member to be sensed, a sensing member, means for positively moving said sensing member across the stationary record member and an indicia thereon, said sensing member being movable transversely to the first mentioned movement upon sensing said indicia, a member associated with said sensing member, connected to said element, and constructed and arranged to be picked up by said sensing member upon said transverse movement of the sensing member and thereupon to be moved by said sensing member during a remaining portion of the movement of said sensing member across the record member to advance said element, and means for positively imparting a return movement to said element, said sensing member having a tooth and the last mentioned member having a plurality of teeth selectively engageable by said tooth in accordance with the indicia sensed.

12. A sensing device for selectively positioning an element under the control of indicia located on a record member to be sensed comprising a sensing member, means for moving said sensing member across the record member and an indicia thereon, said sensing member being movable transversely to the first mentioned movement upon sensing said indicia, a member associated with said sensing member and constructed and arranged to be picked up by said sensing member upon said transverse movement of the sensing member and thereupon to be moved by said sensing member during a remaining portion of the movement of said sensing member, and means moving said sensing member out of engagement with said record member after said transverse movement of the sensing member for a remaining portion of the movement of said sensing member across the record member.

13. In combination with an element to be selectively positioned under the control of indicia located on a record member to be sensed, a sensing member, means for moving said sensing member across the record member and an indicia thereon, said sensing member being movable transversely to the first mentioned movement upon sensing said indicia, a member associated with said sensing member, connected to said element, and constructed and arranged to be picked up by said sensing member upon said transverse movement of the sensing member and thereupon to be moved by said sensing member during a remaining portion of the movement of said sensing member to advance said element, and means moving said sensing member out of engagement with said record member after said transverse movement of the sensing member for a remaining portion of the movement of said sensing member across the record member, and means for positively imparting a return movement to said element.

GEORGE A. SMITH.

References Cited in the file of this patent

UNITED STATES PATENTS

| Number | Name | Date |
|---|---|---|
| 2,340,581 | Cooper | Feb. 1, 1944 |
| 2,508,603 | Gollwitzer | May 23, 1950 |